(12) United States Patent
Watanabe

(10) Patent No.: US 7,886,133 B2
(45) Date of Patent: Feb. 8, 2011

(54) INFORMATION PROCESSING APPARATUS AND METHOD FOR ACCELERATING INFORMATION PROCESSING

(75) Inventor: Fuyuki Watanabe, Yamanashi (JP)

(73) Assignee: NEC Corporation, Tokyo (JP)

( * ) Notice: Subject to any disclaimer, the term of this patent is extended or adjusted under 35 U.S.C. 154(b) by 345 days.

(21) Appl. No.: 11/833,275

(22) Filed: Aug. 3, 2007

(65) Prior Publication Data

US 2008/0034188 A1 Feb. 7, 2008

(30) Foreign Application Priority Data

Aug. 3, 2006 (JP) .............................. 2006-212038

(51) Int. Cl.
*G06F 9/00* (2006.01)
*G06F 9/30* (2006.01)

(52) U.S. Cl. ...................................... 712/234; 712/226

(58) Field of Classification Search ................. 712/220, 712/226, 234

See application file for complete search history.

(56) References Cited

U.S. PATENT DOCUMENTS

| | | | | |
|---|---|---|---|---|
| 5,237,664 A * | 8/1993 | Usami | .......................... | 712/239 |
| 5,321,820 A * | 6/1994 | Nakajima | .................... | 712/239 |
| 5,752,069 A * | 5/1998 | Roberts et al. | ................. | 712/23 |
| 5,781,789 A * | 7/1998 | Narayan | ........................ | 712/23 |
| 5,854,921 A * | 12/1998 | Pickett | ........................ | 712/239 |
| 5,859,999 A * | 1/1999 | Morris et al. | ............... | 712/224 |
| 6,009,512 A * | 12/1999 | Christie | ....................... | 712/226 |
| 6,157,996 A * | 12/2000 | Christie et al. | ............... | 712/218 |
| 7,178,011 B2 * | 2/2007 | Seal et al. | .................... | 712/226 |
| 7,331,040 B2 * | 2/2008 | Sandham et al. | ............ | 717/136 |
| 7,536,682 B2 * | 5/2009 | Dankel et al. | ................ | 717/139 |
| 7,543,284 B2 * | 6/2009 | Bolton et al. | ................ | 717/157 |
| 2003/0149963 A1 * | 8/2003 | Sandham et al. | ............ | 717/138 |
| 2004/0158822 A1 * | 8/2004 | Sandham et al. | ............ | 717/138 |
| 2004/0193859 A1 * | 9/2004 | Okabayashi et al. | ........ | 712/241 |
| 2004/0250051 A1 * | 12/2004 | Seal et al. | .................... | 712/226 |
| 2006/0242387 A1 | 10/2006 | Heishi et al. | | |

FOREIGN PATENT DOCUMENTS

| | | |
|---|---|---|
| JP | 57005152 | 1/1982 |
| JP | 63-178330 | 7/1988 |
| JP | 1069384 | 3/1989 |
| JP | 8305563 | 11/1996 |
| JP | 11327901 | 11/1999 |
| JP | 2003099248 | 4/2003 |
| JP | 2005-063042 | 3/2005 |

* cited by examiner

*Primary Examiner*—Aimee J Li
(74) *Attorney, Agent, or Firm*—Young & Thompson

(57) ABSTRACT

An apparatus comprises an instruction execution control unit which fetches an instruction executed according to a microinstruction, the instruction is classified into a plurality of types, from a memory, wherein the types include a first type indicative of generating a condition code and a second type indicative of not generating the condition code, the condition code corresponds to a result of execution of the instruction, and a condition code generation unit which generates the condition code of the instruction corresponding to the first type on condition that the instruction corresponding to the second type is executed next to the instruction corresponding to the first type.

10 Claims, 7 Drawing Sheets

| CC GENERATION FLAG | CONTENTS |
|---|---|
| 0 | INSTRUCTION FOR NOT GENERATING CC |
| 1 | INSTRUCTION FOR GENERATING CC |

| CC GENERATION TYPE | CC=0 | CC=1 | CC=2 | CC=3 |
|---|---|---|---|---|
| 000 | RESULT=0 | RESULT≠0 | N/A | N/A |
| 001 | RESULT=0 | RESULT<0 | RESULT>0 | O/F |
| ⋮ | | | | |

INFORMATION PROCESSING APPARATUS AND METHOD FOR ACCELERATING INFORMATION PROCESSING

BACKGROUND OF THE INVENTION

The present invention relates to an information processing apparatus and a method for accelerating information processing thereof.

In an information processing apparatus, a condition code indicating a state of an operation result is generated each time an instruction is executed. The generated condition code is used for determination at a conditional branch instruction or a conditional instruction. An example related to a related method for controlling the condition code is described in Japanese Patent Laid-Open No. 8-305563.

In the condition code control described in the Laid-Open No. 8-305563, the condition code is generated each time the instruction is executed. The conditional instruction, in which an operation is executed when a specified condition is satisfied, includes a condition specification field for indicating the specified condition. It is determined whether or not the condition code matches the condition specified in the condition specification field, and only when the condition code matches the condition, the conditional instruction is executed.

In the related method, the condition code is often generated whenever each operation instruction is executed. However, the condition code is not necessarily always used, and an instruction in which the condition code is used is limited to the above described conditional instruction, the conditional branch instruction and the like. Depending on an implementation of a processor or a processor emulation method, a condition code generation process may take more time than the determination of the condition code. It means that it takes time to generate an unnecessary condition code. Moreover, since the above described conditional instruction is the instruction dedicated to the information processing apparatus thereof, it is difficult to maintain compatibility with other software or microinstructions.

Moreover, in Japanese Patent Laid-Open No. 10-69384 and Japanese Patent Laid-Open No. 11-327901, in association with a delayed branch control method for controlling a branch operation of a delayed branch instruction in a processor of a delayed branch method, a condition flag rewriting control method for controlling rewriting of a condition flag is disclosed. In the condition flag rewriting control method, whether the rewriting of the condition flag is allowed or disallowed is controlled based on the order of instructions.

In Japanese Patent Laid-Open No. 57-5152, a technique related to a read control method of a storage device is disclosed. The method includes the storage device, an address register having a counting function, means for creating a next block number address, and means for storing a branch address. The storage device stores a micro program. The address register having the counting function connects directly to the storage device. When a microinstruction word is serially read out from the storage device, the address register having the counting function counts up the address stored in the address register, and the means for creating the next block number address creates the next block number address. The means for storing the branch address stores the branch address included in the microinstruction word read out from the storage device when a branch process is performed, in the address register having the counting function.

In Japanese Patent Laid-Open No. 2003-99248, a technique related to a control function for a processor including instruction supply means, interpreter means, instruction issuing control means, and execution means is disclosed. The instruction supply means supplies multiple instructions, and the interpreter means interprets the multiple instructions respectively. Execution condition information for specifying conditions indicating whether or not the respective instructions are executed is specified in the multiple instructions, and with reference to the conditions specified in the execution condition information, the instruction issuing control means determines an instruction or a set of instructions which executes a valid operation. Operations of the respective instructions are specified in the multiple instructions, and based on the specification, the execution means executes one or more operations. The instruction issuing control means further has the following functions. First, the instruction issuing control means determines whether the instruction is a valid instruction which is required to be executed or an invalid instruction which is not required to be executed, by referring to the conditions specified in the execution condition information. With respect to the instruction determined as the invalid instruction, the instruction issuing control means controls to delete the instruction itself before issuing the instruction to the execution means. Then, instead of the deleted instruction, the instruction issuing control means controls to issue a subsequent valid instruction to the execution means.

SUMMARY OF THE INVENTION

It is an object of the present invention to provide an information processing apparatus in which processing efficiency is improved and a method for accelerating processing thereof.

It is another object of the present invention to provide the information processing apparatus in which processing efficiency is improved without modifying a binary code of a program, and a method for accelerating processing thereof.

An apparatus comprises an instruction execution control unit which fetches an instruction executed according to a microinstruction, the instruction is classified into a plurality of types, from a memory, wherein the types include a first type indicative of generating a condition code and a second type indicative of not generating the condition code, the condition code corresponds to a result of execution of the instruction, and a condition code generation unit which generates the condition code of the instruction corresponding to the first type on condition that the instruction corresponding to the second type is executed next to the instruction corresponding to the first type.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

Figure 1:
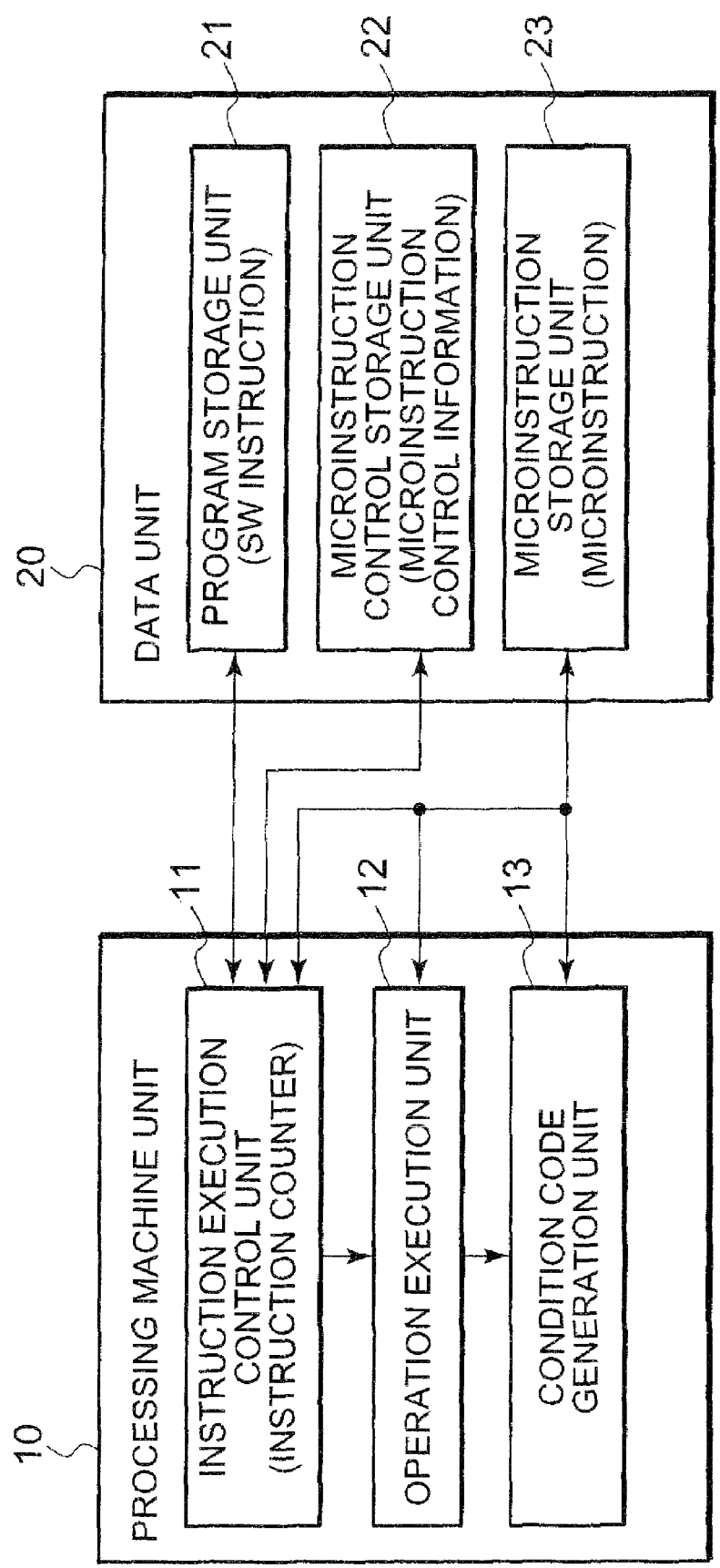
FIG. 1 is a block diagram showing a configuration of the information processing apparatus according to a first exemplary embodiment of the present invention.

Exemplary embodiments of the present invention will be described with reference to the drawings. FIG. 1 is a block diagram showing a configuration of the information processing apparatus according to a first exemplary embodiment. The information processing apparatus includes a processing machine unit 10 and a data unit 20. The processing machine unit 10 includes an instruction execution control unit 11, an operation execution unit 12, and a condition code generation unit 13. The data unit 20 includes a program storage unit 21, a microinstruction control storage unit 22 and a microinstruction storage unit 23.

The program storage unit 21 stores a software instruction row. The microinstruction storage unit 23 stores a microinstruction row for executing a process of each of software instruction. The microinstruction control storage unit 22 stores microinstruction control information 50 for associating each of software instruction with the microinstruction row.

The instruction execution control unit 11, the operation execution unit 12, and the condition code generation unit 13 in the processing machine unit 10 execute the microinstruction stored in the microinstruction storage unit 23. The instruction execution control unit 11 reads the software instruction stored in the program storage unit 21, based on an address retained in an integrated instruction counter. Then, the instruction execution control unit 11 refers to the microinstruction control storage unit 22 and launches the operation execution unit 12 which processes the software instruction. The operation execution unit 12 executes an operation indicated by the software instruction. The condition code generation unit 13 is launched if necessary to generate a condition code (CC) based on a result of execution of the software instruction executed by the operation execution unit 12.

Figure 3:
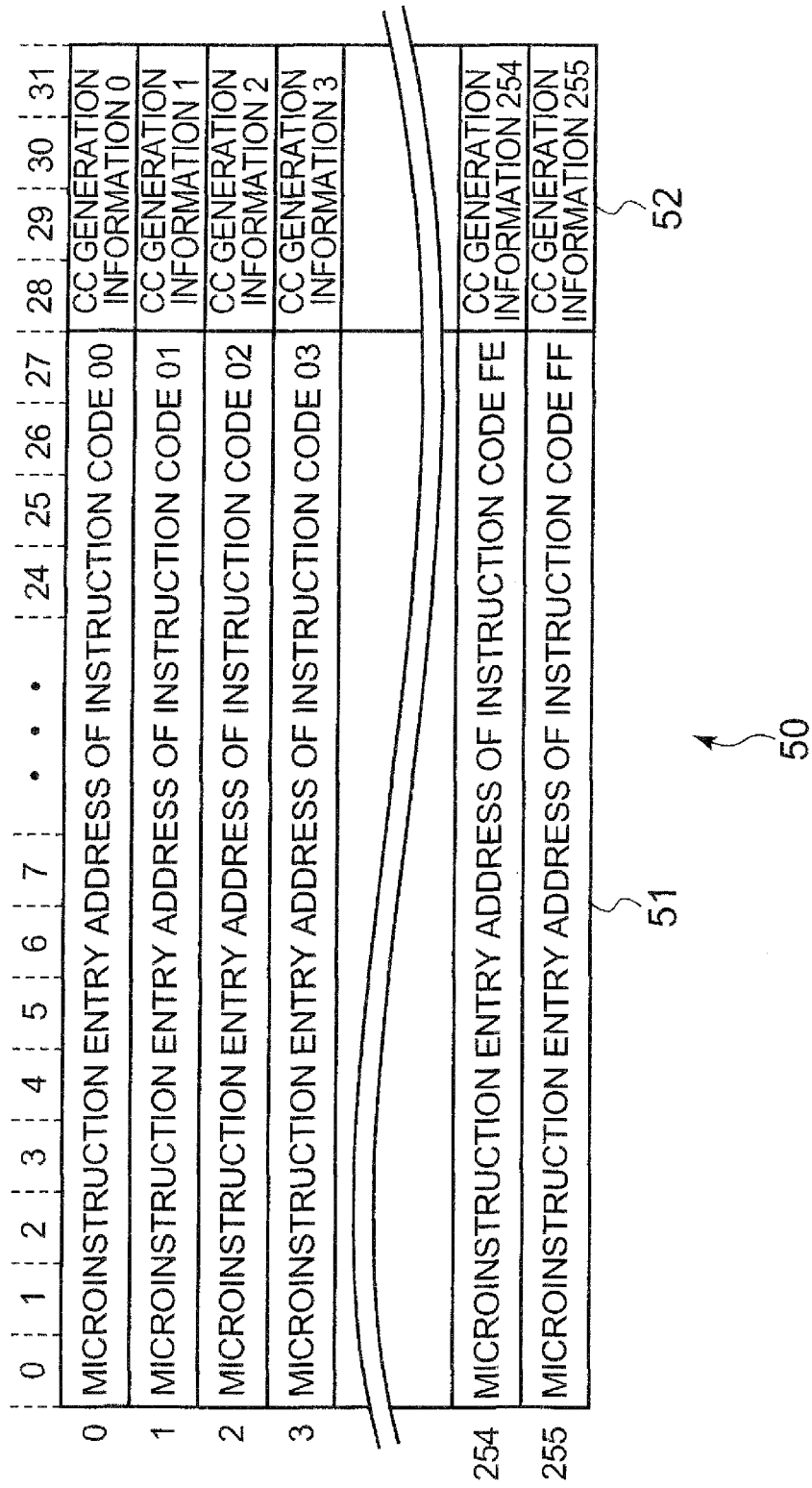
FIG. 3 illustrates microinstruction control information according to the exemplary embodiment of the present invention.

As shown in FIG. 3, the microinstruction control information 50 stored in the microinstruction control storage unit 22 stores microinstruction entry addresses 51 and CC generation information 52 in association with instruction codes of each of the software instruction. Here, if the instruction code is 8 bits, the microinstruction control information 50 retains 256-word information. Each word in the microinstruction control information 50 comprises 32 bits, in which high-order 28 bits indicate the microinstruction entry address 51 and low-order 4 bits indicate the CC generation information 52. The microinstruction entry address 51 indicates a top address of the microinstruction for performing a process operation to be executed by the instruction code.

Figures 4A, 4B, 4C:
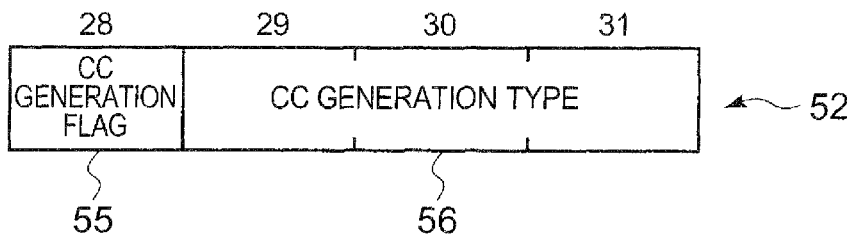
FIGS. 4(a), (b) and (c) illustrate CC (condition code) generation information according to the exemplary embodiment of the present invention.

As shown in FIG. 4(a), the CC generation information 52 includes a CC generation flag 55 of 1 bit and a CC generation type 56 of 3 bits. As shown in FIG. 4(b), the CC generation flag 55 indicates whether or not the software instruction is classified into a type for generating the condition code. In other words, when the CC generation flag 55 is "0", it indicates that the software instruction is classified into the type for not generating the condition code. And when the CC generation flag 55 is "1", it indicates that the software instruction is classified into the type for generating the condition code. Moreover, as shown in FIG. 4(c), the CC generation type 56 indicates a kind of the condition code to be set up. For example, when the generation type 56 is "001", the condition code is set to "0" if an operation result is zero, the condition code is set to "1" if the operation result is negative, the condition code is set to "2" if the operation result is positive, and the condition code is set to "3" if the operation result is overflow.

Next, operations of the above described information processing apparatus will be described.

Figure 5:
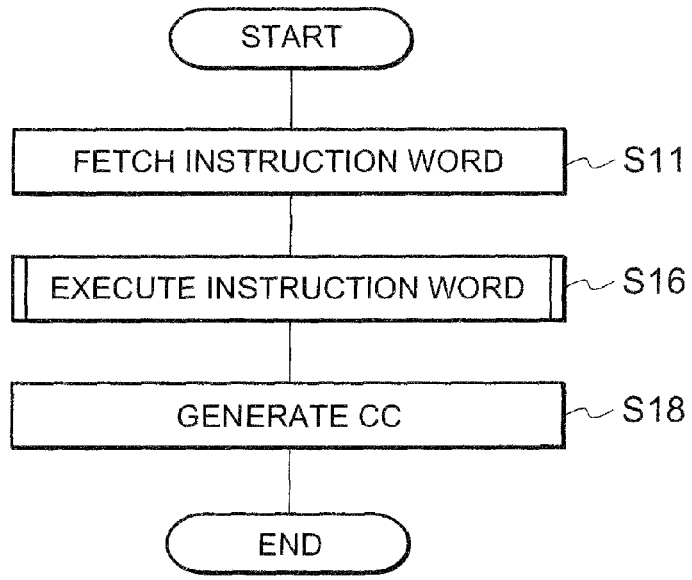
FIG. 5 illustrates an execution flow of a software instruction according to the exemplary embodiment of the present invention.
Figure 6:
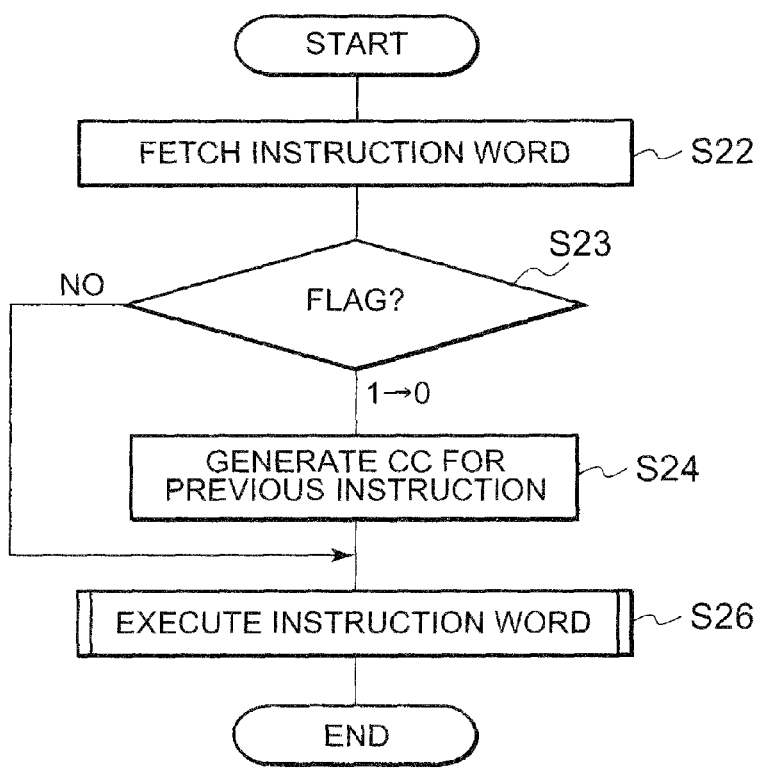
FIG. 6 illustrates an execution flow of a microinstruction for executing the software instruction according to the exemplary embodiment of the present invention.
Figure 7:
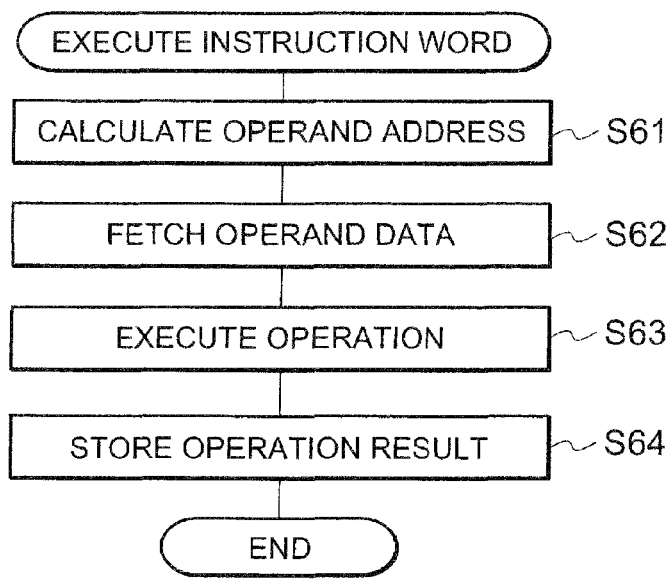
FIG. 7 illustrates an execution flow of an instruction word according to the exemplary embodiment of the present invention.

The procedures for executing the software instruction are shown in FIGS. 5 to 7. One instruction word in the software instruction is executed according to the procedure shown in FIG. 5. First, the instruction execution control unit 11 fetches the instruction word in the software instruction from the program storage unit 21 (step S11). The operation execution unit 12 executes the operation indicated by the fetched instruction word (step S16). The condition code generation unit 13 generates the condition code based on the operation result (step S18). The procedure is repeated to execute the software instruction sequentially.

If the procedure is simply repeated, the condition code is generated each time when each of the software instruction is executed. For example, a program for determining whether or not an addition result is a certain value has the instruction word for adding, the instruction word for subtracting the certain value from its result, and the instruction word for determining whether or not a subtraction result is zero and branching. The condition code is generated when the instruction words for calculating the addition and the subtraction are executed. The condition code is used only when the instruction word for determining and branching is executed. In other words, it is sufficient if only the condition code for reflecting the subtraction result has been generated, and an execution result is not affected even if the condition code has not been generated for the instruction word for adding.

Therefore, in the present invention, as shown in FIG. 6, the generation of the condition code is performed after the fetching of the next instruction word. In other words, the generation of the condition code at step S18 shown in FIG. 5 is delayed until after the fetching of the next instruction word (step S11) and then executed. Furthermore, it is determined whether or not the generation of the condition code is necessary, and the condition code is generated only when the generation of the condition code is necessary.

In other words, one instruction word in the software instruction is executed according to the following procedure. First, the instruction execution control unit 11 fetches one instruction word in the software instruction indicated by the integrated instruction counter, from the program storage unit 21 (step S22).

The instruction execution control unit 11 extracts the instruction code in the fetched software instruction, and uses the instruction code as an index to refer to the microinstruction control information 50 stored in the microinstruction control storage unit 22. If the CC generation flag 55 of the fetched software instruction is "0", that is, if the fetched software instruction corresponds to the type for not generating the condition code, it is determined whether or not a previously executed software instruction corresponds to the type for generating the condition code, that is, the previously executed software instruction has the CC generation flag 55 of "1" (step S23).

When the CC generation flag 55 of the previously executed software instruction is "1" (step S23: 1→0), the condition code generation unit 13 is launched. The condition code generation unit 13 generates the condition code corresponding to the CC generation type 56 of the previously executed software instruction which is executed preceded to the fetched software instruction (step S24). If the CC generation flag 55 of the previously executed software instruction is "0" and if the CC generation flag of the fetched software instruction is "1" (step S23: NO), the condition code of the previously executed software instruction is not generated. In other words, the condition code is generated only when the previously executed software instruction corresponds to the type for generating the condition code and the fetched software instruction corresponds to the type for not generating the condition code.

For the determination of the CC generation flag 55 of the next software instruction, the extracted CC generation information 52 in the microinstruction control information 50 is retained, and also the microinstruction entry address 51 in the microinstruction control information 50 is referred to, and its instruction word is executed (step S26).

The operation execution unit 12 executes the instruction word as shown in FIG. 7. First, an operand address is calculated based on the instruction word. If the operand data is stored in an operation register, an operation register number is calculated, or if the operand data is stored in a main memory, an address of the main memory is calculated (step S61).

The operand data is fetched based on the operand address (step S62), and a predetermined operation corresponding to the instruction word is performed (step S63). When the operation is completed, the operation result is stored at a specified location (step S64). This execution of the instruction word is also the same at step S16 shown in FIG. 5.

After the operation is completed, an instruction word length of the software instruction being executed then is added to the instruction counter integrated in the instruction execution control unit 11. Updating of a value of the instruction counter may be performed after fetching the software instruction. It should be noted that a store destination for the operation result is the instruction counter if the software instruction is a branch instruction, and the instruction counter is updated to a value indicating a branch destination.

As described above, a condition code generation process is executed only when the generation of the condition code is necessary, with reference to the CC generation flag 55. Since the process is omitted when the condition code generation is not necessary, processing efficiency is improved.

Next, operations of the software instruction by the operation execution unit 12 will be described. A program for adding data stored in the memory and branching if the addition result is zero is taken as an example. An operation instruction A and an operation instruction B are software instructions for specifying the address of the data stored in the memory, taking the data from the memory, and storing the data in a register. The instruction codes of the operation instruction A and the operation instruction B are the same, but their operands are different. Since they are the instructions corresponding to the type for generating the condition code, the CC generation flag 55 is set to "1", and the CC generation type 56 is set to "000". The CC generation information 52 is set at a predetermined location in the microinstruction control information 50. An operation instruction C is an instruction for indicating an addition between registers, and specifies three registers as its operand.

The operation instruction C is the instruction corresponding to the type for generating the condition code based on the addition result, and the CC generation flag 55 is set to "1" and the CC generation type 56 is set to "001", as the microinstruction control information 50. When the condition code is set to "0", that is, when it is indicated that "the operation result is zero", the branch instruction sets a branch address to the instruction counter and performs the branch operation. The branch instruction corresponds to the type for not generating the condition code.

Figure 8:
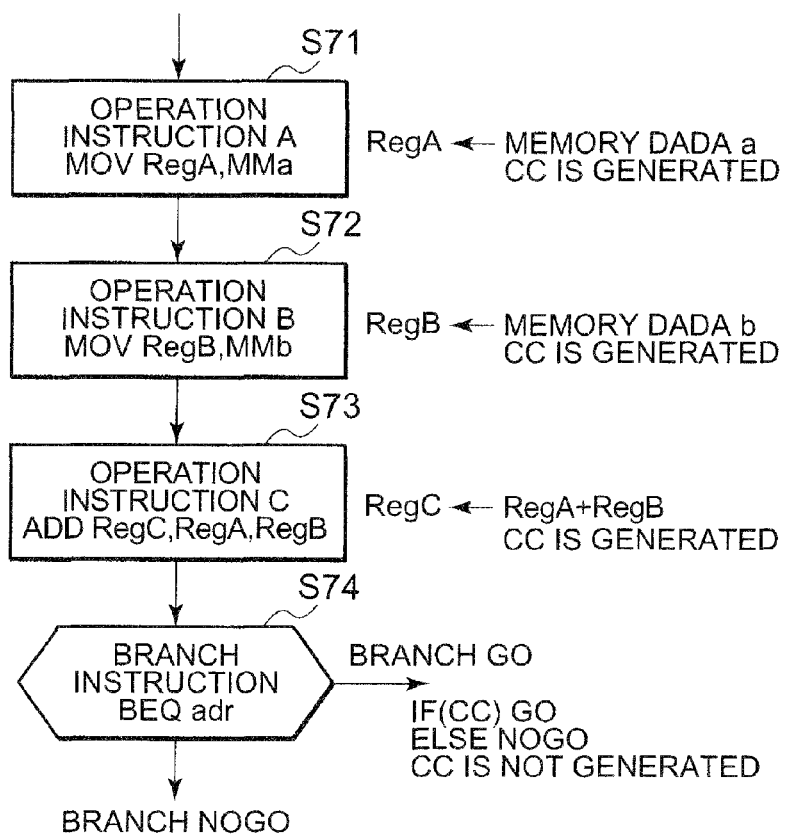
FIG. 8 illustrates an execution sequence of the software instruction according to the exemplary embodiment of the present invention.

As shown in FIG. 8, the software instructions are executed in an order of the operation instruction A, the operation instruction B, the operation instruction C and the branch instruction. If the generation of the condition code is performed in a sequence of the software instructions, the condition codes are generated at the respective instruction of the operation instructions A/B/C.

In other words, the operation instruction A takes memory data "a" from the memory indicated by an address "MMa", and stores the data "a" in a register RegA. When "0" is stored in the register RegA, the condition code is set to "0", or when data stored in the register RegA is not "0", the condition code is set to "1" (step S71). Similarly, the operation instruction B takes memory data "b" from the memory indicated by an address "MMb", and stores the data "b" in a register RegB. When "0" is stored in the register RegB, the condition code is set to "1", or when data stored in the register RegB is not "0", the condition code is set to "1" (step S72). The operation instruction C adds the data stored in the register RegA and the data stored in the register RegB, and stores the addition result in a register RegC. The CC generation type 56 of the operation instruction C is "001". Therefore, as shown in FIG. 4(c), the condition code "0" is generated if the addition result is zero, the condition code "1" is generated if the addition result is negative, the condition code "2" is generated if the addition result is positive, or the condition code "3" is generated if the addition result is overflow (step S73). The branch instruction operates to branch when the condition code set by the operation instruction C indicates "0" (step S74). Therefore, the condition codes generated at the operation instruction A and the operation instruction B are not used, which means that they have been uselessly generated.

Figure 9:
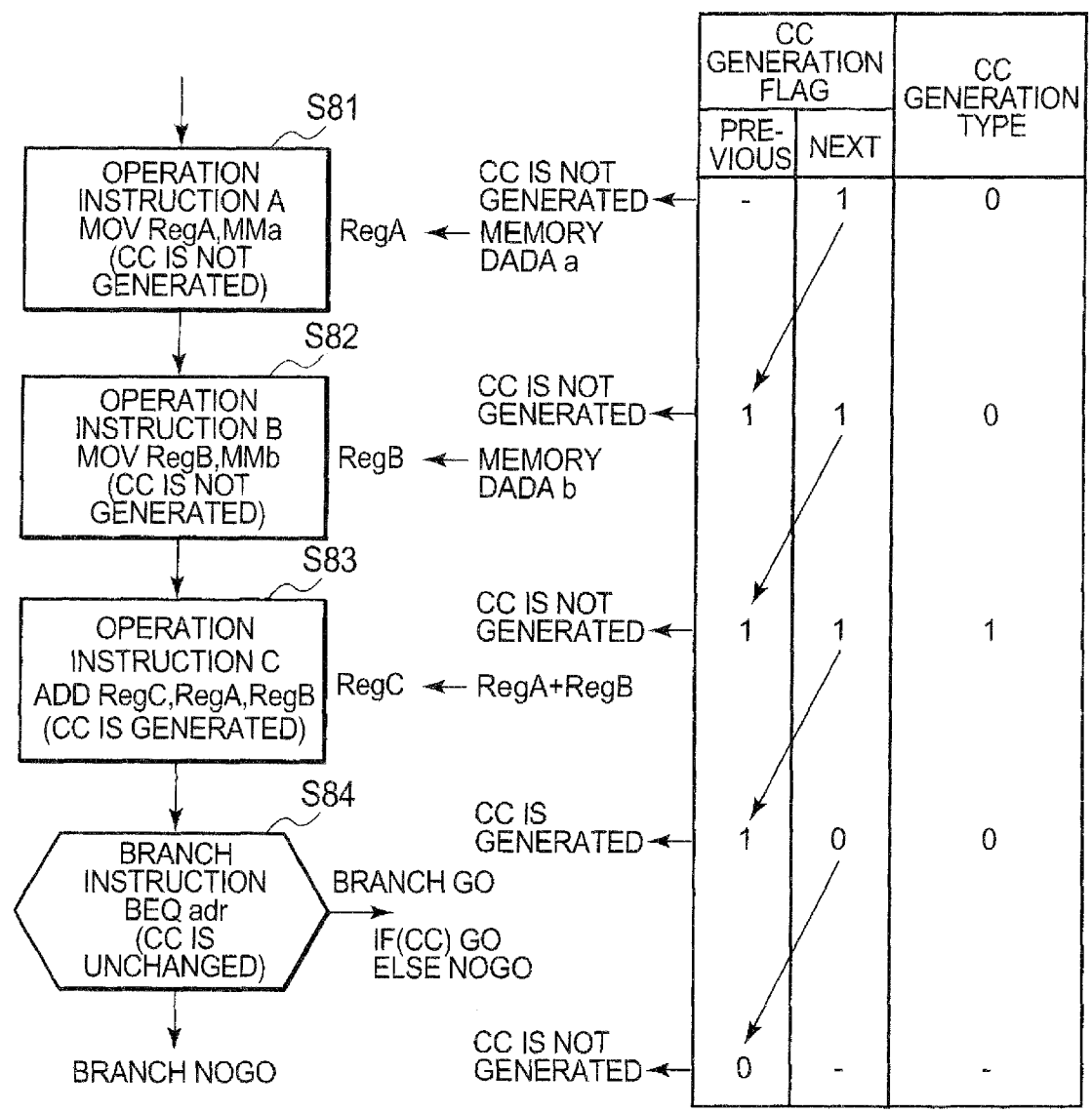
FIG. 9 illustrates that a condition code generation process according to the exemplary embodiment of the present invention is omitted.

As shown in FIG. 6, if the generation of the condition code is delayed until after fetching the instruction word of the next instruction, the generation of the condition code can be omitted as shown in FIG. 9. A procedure thereof will be described below.

The instruction execution control unit 11 fetches the operation instruction A. Based on the instruction code of the operation instruction A, the instruction execution control unit 11 fetches the microinstruction control information 50 stored in the microinstruction control storage unit 22. Since the operation instruction A has the CC generation flag 55 of "1", the operation instruction A is not affected by the previously executed instruction, and the condition code generation unit 13 is not launched. Based on the microinstruction entry address 51 of the operation instruction A set in the microinstruction control information 50, the instruction execution control unit 11 launches the operation execution unit 12. The operation execution unit 12 calculates the operand address, takes the data "a" from the memory indicated by the address "MMa", and stores the data "a" in the register RegA (step S81).

The instruction execution control unit 11 fetches the operation instruction B. Since the instruction code of the operation instruction B is the same as the instruction code of the operation instruction A, the microinstruction control information 50 is the same. Since the operation instruction B has also the CC generation flag 55 of "1", the condition code generation unit 13 is not launched. Therefore, the condition code corresponding to the operation instruction A is not generated. Based on the top address of the microinstruction of the operation instruction B, the instruction execution control unit 11 launches the operation execution unit 12. The operation instruction A and the operation instruction B have the top address of the same microinstruction, and perform the same operation. The operation execution unit 12 calculates the operand address, takes the data "b" from the memory indicated by the address MMb, and stores the data "b" in the register RegB (step S82).

The instruction execution control unit 11 fetches the operation instruction C. Based on the instruction code of the operation instruction C, the instruction execution control unit 11 fetches the microinstruction control information 50 stored in the microinstruction control storage unit 22. Since the operation instruction C has also the CC generation flag 55 of "1", the condition code generation unit 13 is not launched. Therefore, the condition code corresponding to the operation instruction B is not generated. Based on the microinstruction entry address 51 of the operation instruction C set in the microinstruction control information 50, the instruction execution control unit 11 launches the operation execution unit 12. The operation execution unit 12 adds the data "a" stored in the register RegA and the data "b" stored in the register RegB. The addition result is stored in the register RegC (step S83).

The instruction execution control unit 11 fetches the branch instruction. Based on the instruction code of the branch instruction, the instruction execution control unit 11 fetches the microinstruction control information 50 stored in the microinstruction control storage unit 22. Since the branch instruction has the CC generation flag 55 of "0", the instruction execution control unit 11 checks the CC generation flag 55 of the preceded instruction which is retained in the instruction execution control unit 11. The preceded instruction is the instruction which is executed precedent to the branch instruction. Since the preceded instruction (the operation instruction C) has the CC generation flag 55 of "1", the condition code generation unit 13 is launched. Based on the CC generation type 56 of the operation instruction C, the condition code generation unit 13 generates the condition code corresponding to the preceded instruction (the operation instruction C). Since the CC generation type 56 of the operation instruction C is "1" F the condition code generation unit 13 generates the condition code of "0" if the addition result is 0, generates the condition code of "1" if the addition result is negative, generates the condition code of "2" if the addition result is positive, or generates the condition code of "3" if the addition result is overflow. Then, based on the microinstruction entry address 51 of the branch instruction set in the microinstruction control information 50, the instruction execution control unit 11 launches the operation execution unit 12. The operation execution unit 12 executes the microinstruction, and determines whether or not the branch is performed, based on the condition code. If the condition is not satisfied, the execution of the branch instruction is ended. If the branch is performed, the branch address is calculated and set to the instruction counter. Thereby the branch is performed (step S84).

Then, if the branch instruction further follows, since the branch instruction executed at step S84 has the CC generation flag 55 of "0", the condition code generation unit 13 is not launched. Since the condition code is not changed, it is possible to perform processes in the respective conditions by arranging the branch instructions corresponding to the respective condition codes which can be generated with the operation instruction C.

As described above, the instruction being an object of generating of the condition code is only the operation instruction C which is just precedent to the branch instruction, and the generation of the condition code with the operation instruction A and the operation instruction B is omitted. When the software instruction is executed, it is determined whether the generation of the condition code is performed or omitted, depending on its execution order. In other words, such a useless condition code that is overwritten by the next instruction is not generated. Therefore, the processing efficiency of the information processing apparatus is improved. Moreover, the compatibility of the software instructions is completely maintained.

Figure 2:
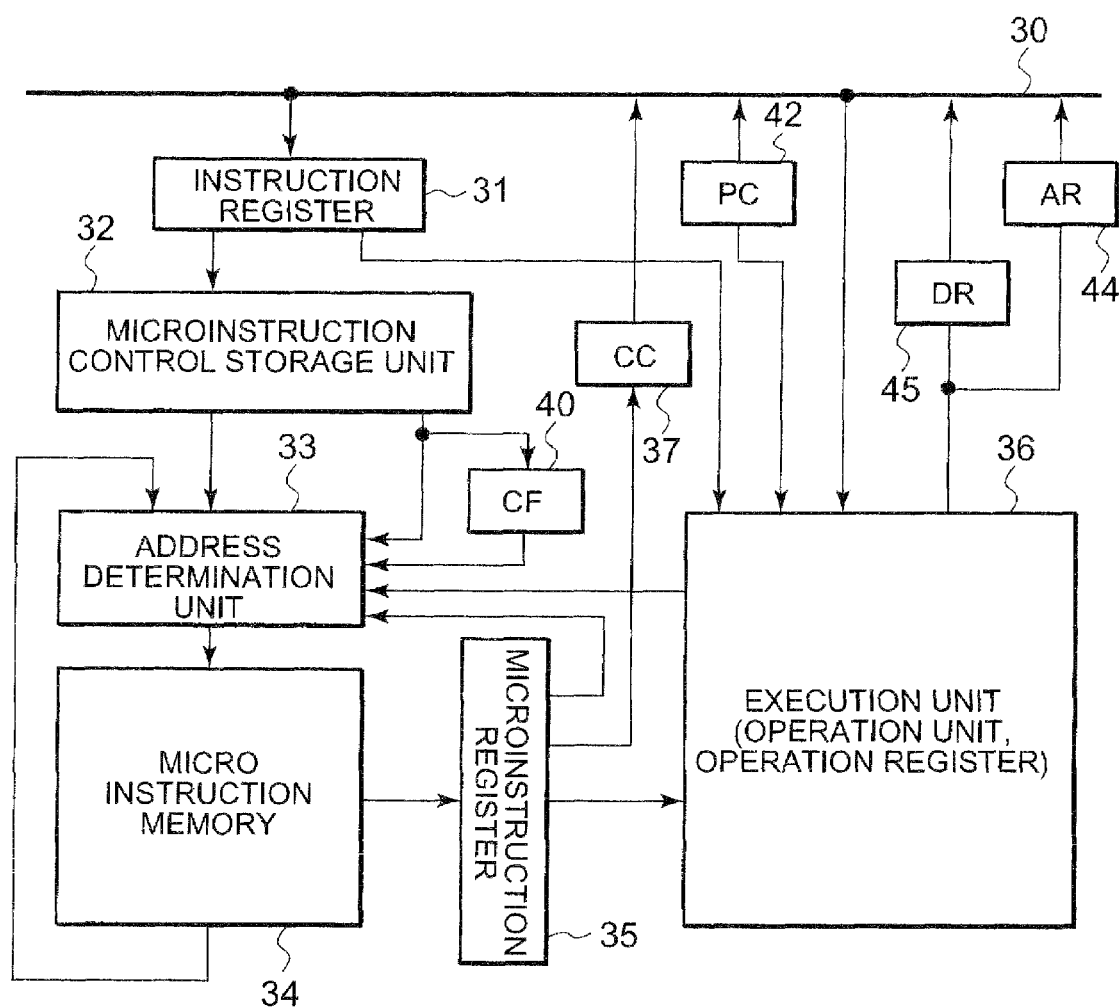
FIG. 2 is a block diagram showing a configuration of the information processing apparatus according to a second exemplary embodiment of the present invention.

FIG. 2 shows a configuration of the information processing apparatus according to a second exemplary embodiment. Here, a CPU (Central Processing Unit) part of the information processing apparatus will be described in detail. The main memory, which is not shown, is connected via a bus 30. The CPU includes an instruction register 31, a microinstruction control storage unit 32, an address determination unit 33, a microinstruction memory 34, a microinstruction register 35, an execution unit 36, a condition code register (CC) 37, a CC generation flag register (CE) 40, a program counter (PC) 42, an address register (AR) 44 and a data register (DR) 45.

The instruction register 31 fetches the software instruction stored in the main memory whose address is specified by the program counter 42, via the bus 30 from the main memory, and retains the software instruction. The microinstruction control storage unit 32 stores the microinstruction control information 50. In other words, as shown in FIG. 3, the microinstruction control storage unit 32 stores the microinstruction entry addresses 51 and the CC generation information 52, in association with the instruction codes of the software instruction. As shown in FIG. 4(a), the CC generation information 52 includes the CC generation flag 55 and the CC generation type 56. As shown in FIG. 4(b), the CC generation flag 55 indicates whether or not the software instruction corresponds to the type for generating the condition code. As shown in FIG. 4(c), the CC generation type 56 indicates the value of the condition code to be generated. The microinstruction control storage unit 32 outputs the entry address 51 corresponding to the instruction code of the software instruction retained in the instruction register 31 to the address determination unit 33, and outputs the CC generation information 52 to the address determination unit 33 and the CC generation flag register 40.

The address determination unit 33 determines the address of the microinstruction to be executed. The address determination unit 33 increments the execution addresses by one as often as the microinstruction is executed. When the branch is performed, based on branch conditions inputted by the CC generation flag register 40, the microinstruction register 35, the microinstruction control storage unit 32 and the execution unit 36, the address determination unit 33 takes the entry address 51 outputted from the microinstruction control storage unit 32 and the branch address outputted from the microinstruction memory 34, and then sets the execution address.

Based on the execution address outputted from the address determination unit 33, the microinstruction memory 34 is accessed. The microinstruction extracted from the microinstruction memory 34 is set in the microinstruction register 35. The microinstruction set in the microinstruction register 35 is decoded, and a control signal is supplied to the execution unit 36 or the respective registers.

The execution unit 36 includes an operation unit and an operation register. The execution unit 36 performs arithmetic operations and logical operations based on the data taken from the bus 30, the data retained in the integrated operation register and the like, and stores operation results in the integrated operation register, the program counter 42, the address register 44 and the data register 45. In addition, states during the operations are outputted to the address determination unit 33.

The program counter 42 indicates the execution address of the software instruction, and increments the execution address by one as often as the software instruction is executed. When the branch instruction or the like is executed, the output of the execution unit 36 is stored in the program counter 42. The address register 44 stores the address of the data to be stored in the main memory. When a main memory access is performed, the address register 44 supplies the address of the main memory to the bus 30. The data register 45 retains the data to be stored in the main memory. Typically, the data stored in the data register 45 is written via the bus 30 to the address of the main memory, the address is specified by the address register 44.

With reference to FIG. 6, operations of this CPU will be described below.

The execution address stored in the program counter 42 is supplied to the bus 30, and the software instruction is fetched. The software instruction extracted from the main memory is stored in the instruction register 31 via the bus 30 (step S22).

Based on the instruction code of the software instruction stored in the instruction register 31, the entry address 51 corresponding to the instruction code and the CC generation information 52 are outputted from the microinstruction control storage unit 32. Based on the CC generation flag 55 of the fetched software instruction which is outputted from the microinstruction control storage unit 32, and the CC generation flag 55 stored in the CC generation flag register 40, the CC generation flag corresponds to the preceded instruction, the address determination unit 33 determines whether or not the condition code is generated. The address determination unit 33 determines the address to be executed next (step S23).

When the flag stored in the CC generation flag register 40 is "1" (the type for generating the condition code) and the flag outputted from the microinstruction control storage unit 32 is "0" (the type for not generating the condition code) (step S23: 1→0), a routine for generating the condition code of the software instruction which is executed precedent to the software instruction been under execution is started. In other words, by the microinstruction, it is determined which value of condition code should be generated based on that the operation result outputted from the execution unit 36 and the CC generation type 56 stored in the CC generation flag register 40. Then, the corresponding condition code is set in the condition code register 37 by the microinstruction (step S24).

If the condition code is not generated (step S23: NO), the address determination unit 33 gives the address corresponding to the next step S26 to the microinstruction memory, and the routine for generating the condition code is not executed. Here, since the instruction word to be executed has been stored in the instruction register 31, the program counter 42 may be updated at any timing. However, from the viewpoint of retaining the state of the execution unit 36, the updating is preferably performed precedent to execution of the ¥step S26.

Next, the execution of the instruction word is performed (step S26). As shown in FIG. 7, in the execution of the instruction word, the calculation of the operand address is performed first. If the operand data has been stored in the operation register, the operation register number in the execution unit 36 is calculated. If the operand data has been stored in the main memory, the operand address is calculated by the execution unit 36, and the operand address is set in the address register 44 (step S61). The operand data specified by the address register 44 is supplied to the execution unit 36 via the bus 30 (step S62). When all of the operand data are gathered, the execution unit 36 executes the operation (step S63). The operation result is stored in the specified register (step S64). For example, the operation result is stored in the operation register integrated in the execution unit 36 for the next operation. Moreover, if the operation result is stored in the program counter 42, the value of the operation result indicates the branch address of the branch instruction. When the operation result is stored in the main memory, the operation result is stored in the data register 45.

When the operation is completed, the next software instruction is fetched (step S11), and based on a state of the CC generation flag 55, it is determined whether or not the condition code of the completed operation is generated (step S23). In this way, after the fetching of the software instruction, the condition code of the previously executed software instruction is generated if necessary. The software instruction is executed under the control of the microinstruction. It should be noted that since the operations of executing the software instruction are the same as the first exemplary embodiment, the description thereof is omitted.

In this way, depending on arrangement of the software instructions when they are executed, the arrangement of the CC generation flag 55 is settled, and if necessary, the microinstruction for generating the condition code is executed. In the case where the condition code is generated but not used, the condition code generation is omitted. Therefore, the processing time is reduced. In other words, processing efficiency of the CPU can be improved. Moreover, since the condition code generation is performed based on the CC generation flag 55 stored in the microinstruction control storage unit 32, the processing efficiency of the information processing apparatus can be improved while maintaining the compatibility of the software instructions or the microinstructions.

Here, the CC generation flag 55 has indicated whether or not the instruction corresponds to the type for generating the condition code, with 1 bit. With respect to the types of the instruction, by classifying the instructions into the instruction of the type for generating the condition code, the instruction of the type for using the condition code, the instruction of the type for maintaining the condition code (the type irrelevant to generation of the condition code) and the like, and by indicating the type with two or more bits, it is possible to further reduce the condition code generation process. For example, when the branch destination of an unconditional branch instruction (the instruction corresponding to the type for maintaining the condition code) subsequent to the operation instruction (the instruction corresponding to the type for generating the condition code) is the operation instruction (the instruction corresponding to the type for generating the condition code), the condition code generation process for the former operation instruction can be omitted. At this time, if the branch instruction is not the unconditional branch instruction but a conditional branch instruction (the instruction corresponding to the type for using the condition code), the condition code generation process for the former operation instruction is executed. In this way, in sequential multiple software instructions, it is possible to further reduce the condition code generation process by determining necessity of the condition code. Moreover, also in an information processing apparatus which simultaneously executes the multiple instructions, it is possible to reduce the condition code generation.

Moreover, similarly to the condition code, also with respect to other information, by analyzing dependency among related multiple instructions, adding a new flag to the microinstruction control information 52 and controlling it, it is also possible to reduce some processes which do not become problematic as substantial operations even if they do not operate as specified in an instruction set.

By providing the CC generation flag, it is possible to determine whether or not the condition code is required to be generated, in a flow of the program, and if not required, it is possible to suppress the condition code generation process. Moreover, since the CC generation flag is set in the CC generation information as a parameter which is used when the microinstruction corresponding to the software instruction is executed, it is not necessary to modify the software instruction and the microinstruction.

According to the present invention, it is possible to provide an information processing apparatus in which processing efficiency is improved and a method for accelerating processing thereof.

Moreover, according to the present invention, it is possible to provide an information processing apparatus in which processing efficiency is improved without modifying a binary code of a program and a method for accelerating processing thereof.

From the viewpoint of the present invention, an information processing apparatus includes an instruction execution control unit (11), an operation execution unit (12) and a condition code generation unit (13). An instruction executed by the information processing apparatus is classified into multiple kinds. The instruction execution control unit (11) accesses a memory (21) which stores a program, and fetches the instruction. The operation execution unit (12) executes the fetched instruction according to a microinstruction. The condition code generation unit (13) generates a condition code indicating a state of a result of executing the instruction, when anteroposterior relationship of the kinds of the instruction defined corresponding to an order in which the instruction is executed satisfies a predetermined condition.

The information processing apparatus of the present invention further includes a microinstruction storage unit (23) and a microinstruction control storage unit (22). The microinstruction storage unit (23) stores the microinstruction. The microinstruction control storage unit (22) stores microinstruction control information in association with an instruction code. The microinstruction control information includes a top address of the microinstruction and a CC generation flag indicating the kinds of the instruction. The top address of the microinstruction is a top address of an area in which the microinstruction corresponding to each instruction has been stored in the microinstruction storage unit (23), and the microinstruction corresponding to each instruction is executed from this top address. The condition code generation unit (13) is launched based on this CC generation flag, and generates the condition code.

The information processing apparatus of the present invention further includes a flag retaining unit for retaining the CC generation flag fetched from the microinstruction control storage unit (22). The condition code generation unit (13) is launched, based on the CC generation flag of a previously executed instruction which is retained in this flag retaining unit, and the CC generation flag of an unexecuted instruction which is fetched from the microinstruction control storage unit (22).

In the present invention, the instruction to be executed includes a first kind of instruction and a second kind of instruction. The first kind of instruction is an instruction of a type for generating the condition code. The second kind of instruction is an instruction of a type for not generating the condition code. The instruction execution control unit (11) launches the condition code generation unit (13) when the second kind of instruction is fetched from the memory (21) after the first kind of instruction. The condition code generation unit (13) generates the condition code indicating a state of a result of executing the first kind of instruction.

Moreover, in the present invention, the second kind of instruction to be executed may be further classified into a third kind of instruction and a fourth kind of instruction. The third kind of instruction is an instruction of a type for referring to the condition code. The fourth kind of instruction is an instruction of a type for not referring to the condition code. In that case, the instruction execution control unit (11) launches the condition code generation unit (13) when the third kind of instruction is fetched following the first kind of instruction, or when the third kind of instruction is fetched following the first kind of instruction and the fourth kind of instruction. The condition code generation unit (13) generates the condition code indicating the state of the result of executing the first kind of instruction.

From another viewpoint of the present invention, a method for accelerating an information processing apparatus includes a fetch step (step S22), an execution step (step S26) and a CC generation step (step S24). In this information processing apparatus, an instruction is classified into multiple kinds. The fetch step (step S22) accesses a memory (21) which stores a program, and fetches the instruction. The execution step (step S26) executes the fetched instruction according to a microinstruction. The CC generation step (step S24) generates a condition code indicating a state of a result of executing the instruction, when anteroposterior relationship of the kinds of the instruction defined corresponding to an order in which the instruction is executed satisfies a predetermined condition.

In the method for accelerating the information processing apparatus of the present invention, the information processing apparatus further includes a microinstruction storage unit (23) and a microinstruction control table. The microinstruction storage unit (23) stores the microinstruction. The microinstruction control table stores microinstruction control information in association with an instruction code of the instruction. The microinstruction control information includes a top address of the microinstruction storage unit (23) in which the microinstruction corresponding to the instruction is stored, and a CC generation flag indicating the kinds of the instruction. The fetch step includes a determination step of fetching a CC generation flag based on the instruction code and determining whether or not a predetermined condition is satisfied.

In the method for accelerating the information processing apparatus of the present invention, the determination step and the CC generation step are executed after the next instruction is fetched by the fetch step. In other words, the respective steps are executed in an order of the fetch step, the determination step, the CC generation step with respect to the execution of the previous instruction (if the condition is satisfied), and the execution step.

In the present invention, the instruction includes a first kind of instruction for generating the condition code and a second kind of instruction for not generating the condition code. When the instruction is fetched in an order of the first kind of instruction and the second kind of instruction by the fetch step, the CC generation step includes a step of generating the condition code indicating a state of a result of executing the first kind of instruction.

Moreover, in the present invention, the second kind of instruction may include a third kind of instruction and a fourth kind of instruction. The third kind of instruction is an instruction of a type for referring to the condition code. The fourth kind of instruction is an instruction of a type for not referring to the condition code. In that case, when the third kind of instruction is fetched following the first kind of instruction, or when the third kind of instruction is fetched following the first kind of instruction and the fourth kind of instruction, by the fetch step, the CC generation step includes a step of generating the condition code indicating the state of the result of executing the first kind of instruction.

Moreover, from another viewpoint of the present invention, a program is a program for causing an information processing apparatus to execute a fetch process (step S22), an execution process (step S26) and a CC generation process (step S24). An instruction to be executed by the information processing apparatus is classified into multiple kinds and executed according to a microinstruction. The fetch process (step S22) is a process of accessing a memory and fetching the instruction. The execution process (step S26) executes the fetched instruction according to the microinstruction. The CC generation process (step S24) generates a condition code indicating a state of a result of executing the instruction, when anteroposterior relationship of the kinds of the instruction defined corresponding to an order in which the instruction fetched by the fetch process is executed satisfies a predetermined condition.

In the program of the present invention, when a predetermined condition is satisfied, the CC generation process is executed after the next instruction is fetched by the fetch process. In other words, the microinstruction is executed in an order of the fetch process, the CC generation process with respect to the execution of the previous instruction when the condition is satisfied, and the execution process.

In the program of the present invention, a microinstruction storage unit and a microinstruction control table are further included, and the fetch process includes a determination process of fetching a CC generation flag based on an instruction code and determining whether or not a predetermined condition is satisfied. The microinstruction storage unit stores the microinstruction. The microinstruction control table stores microinstruction control information in association with the instruction code of the instruction. The microinstruction control information includes a top address of the microinstruction storage unit in which the microinstruction corresponding to the instruction is stored, and a CC generation flag indicating the kinds of the instruction.

In the program of the present invention, the instruction includes a first kind of instruction for generating the condition code and a second kind of instruction for not generating the condition code. When the instruction is fetched in an order of the first kind of instruction and the second kind of instruction by the fetch process, the CC generation process generates the condition code indicating a state of a result of executing the first kind of instruction.

Moreover, in the program of the present invention, the second kind of instruction may include a third kind of instruction for referring to the condition code and a fourth kind of instruction for not referring to the condition code. In that case, when the third kind of instruction is fetched following the first kind of instruction, or when the third kind of instruction is fetched following the first kind of instruction and the fourth kind of instruction, by the fetch process, the CC generation process includes a process of generating the condition code indicating the state of the result of executing the first kind of instruction.

The program for causing the information processing apparatus of the present invention to execute the processes is recorded in a recording medium readable by the information processing apparatus.

What is claimed is:

1. An apparatus, comprising:
   an instruction execution control unit which fetches an instruction from a memory, said instruction is executed according to a microinstruction; and
   said instruction is classified into a plurality of types;
   wherein said types include a first type indicative of generating a condition code and a second type indicative of not generating said condition code, said condition code corresponds to a result of execution of said instruction; and
   a condition code generation unit which generates said condition code of said instruction corresponding to said first type during execution of said instruction corresponding to said second type being executed after said instruction corresponding to said first type,
   wherein said condition code generation unit generates said condition code upon a flag corresponding to said preceded instruction indicating said first type and said flag corresponding to said instruction under execution indicating said second type.

2. The apparatus according to claim 1, further comprises:
   a microinstruction control storage unit which stores said flag in association with said instruction, said flag is indicative of said types; and
   wherein said condition code generation unit generates said condition code according to said flag.

3. The apparatus according to claim 2, further comprises:
   an operation execution unit which executes said instruction according to said microinstruction in order of fetch by said instruction execution control unit;
   wherein said instruction execution control unit retains said flag corresponding to a preceded instruction, said preceded instruction is executed precedent to said instruction under execution by said operation execution unit; and
   wherein said condition code generation unit generates said condition code according to said flag corresponding to said preceded instruction and said flag corresponding to said instruction under execution.

4. The apparatus according to claim 1, wherein said second type includes a third type indicative of referring to said condition code and a fourth type indicative of not referring to said condition code; and
   a condition code generation unit which generates said condition code of said instruction corresponding to said first type upon said instruction corresponding to said third type being executed after said instruction corresponding to said first type is executed.

5. The apparatus according to claim 1, wherein said second type includes a third type indicative of referring to said condition code and a fourth type indicative of not referring to said condition code; and
   a condition code generation unit which generates said condition code of said instruction corresponding to said first type upon said instruction corresponding to said third type being executed after said instruction corresponding to said first type and said fourth type is executed.

6. A method, comprising:
fetching an instruction from a memory, executing said instruction according to a microinstruction of said instruction, said instruction is classified into a plurality of types;
wherein said types include a first type indicative of generating a condition code and a second type indicative of not generating said condition code, said condition code is indicative of a state of a result of execution of said instruction;
generating said condition code of said instruction corresponding to said first type during execution of said instruction corresponding to said second type being executed after said instruction corresponding to said first type; and
generating said condition code upon a flag corresponding to said preceded instruction indicates said first type and said flag corresponding to said instruction under execution indicates said second type.

7. The method according to claim 6, further comprises:
referring to said flag corresponding to said instruction, said flag is indicative of said types;
generating said condition code according to said flag.

8. The method according to claim 7, further comprises:
executing said instruction according to said microinstruction in order of fetch;
retaining said flag corresponding to a preceded instruction, said preceded instruction is executed precedent to said instruction under execution; and
generating said condition code according to said flag corresponding to said preceded instruction and said flag corresponding to said instruction under execution.

9. The method according to claim 6, further comprises:
wherein said second type includes a third type indicative of referring to said condition code and a fourth type indicative of not referring to said condition code; and
generating said condition code of said instruction corresponding to said first type on upon said instruction corresponding to said third type is executed after said instruction corresponding to said first type is executed.

10. The method according to claim 6, further comprises:
wherein said second type includes a third type indicative of referring to said condition code and a fourth type indicative of not referring to said condition code; and
generating said condition code of said instruction corresponding to said first type upon said instruction corresponding to said third type being executed after said instruction corresponding to said first type and said fourth type is executed.

\* \* \* \* \*